(12) United States Patent
Choi et al.

(10) Patent No.: US 7,574,770 B2
(45) Date of Patent: Aug. 18, 2009

(54) SYSTEM FOR AUTOMATICALLY CLEANING AND INSPECTING STUD BOLT HOLES, AND MANAGING HISTORIES OF THE STUD BOLT HOLES

(75) Inventors: Sang-Hoon Choi, Yongin (KR); Min-Su Park, Seongnam (KR)

(73) Assignee: Korea Plant Service & Engineering Co., Ltd., Seongnam (KR)

( * ) Notice: Subject to any disclaimer, the term of this patent is extended or adjusted under 35 U.S.C. 154(b) by 400 days.

(21) Appl. No.: 11/551,040

(22) Filed: Oct. 19, 2006

(65) Prior Publication Data
US 2007/0251045 A1 Nov. 1, 2007

(30) Foreign Application Priority Data
Apr. 26, 2006 (KR) .................. 10-2006-0037529

(51) Int. Cl.
*A47L 5/38* (2006.01)
*A47L 5/00* (2006.01)

(52) U.S. Cl. .................................... 15/304; 15/319
(58) Field of Classification Search .................. 15/302, 15/304, 308, 319, 339
See application file for complete search history.

(56) References Cited

U.S. PATENT DOCUMENTS

| | | | | |
|---|---|---|---|---|
| 4,315,688 | A * | 2/1982 | Pryor | 356/73 |
| 6,230,568 | B1 * | 5/2001 | Winston et al. | 73/601 |
| 7,173,692 | B2 * | 2/2007 | Yasuda et al. | 356/237.1 |

* cited by examiner

*Primary Examiner*—Dung Van Nguyen
(74) *Attorney, Agent, or Firm*—Holme Roberts & Owen LLP (57) ABSTRACT

A system for cleaning and inspecting stud bolt holes, and managing damage histories of the stud bolt holes is disclosed. The system allows an operator to clean stud bolt holes to inspect the stud bolt holes with the naked eye, and manage damage histories of the stud bolt holes. The stud bolt holes fix a nuclear reactor, a nuclear reactor coolant pump head and a pressure vessel main body thereto.

12 Claims, 9 Drawing Sheets

PRIOR ART

FIG. 9

SYSTEM FOR AUTOMATICALLY CLEANING AND INSPECTING STUD BOLT HOLES, AND MANAGING HISTORIES OF THE STUD BOLT HOLES

BACKGROUND OF THE INVENTION

1. Field of the Invention

The present invention relates to a technique of a system for handling stud bolt holes, and more particularly to a system for cleaning and inspecting stud bolt holes, and for managing damage histories of the stud bolt holes, which allows an operator to clean stud bolt holes, inspect the stud bolt holes with the naked eye, and manage damage histories of the stud bolt holes, in which the stud bolts holes serve to fix a nuclear reactor, a nuclear reactor coolant pump head, and a pressure vessel main body thereto.

2. Description of the Related Art

Figure 1:
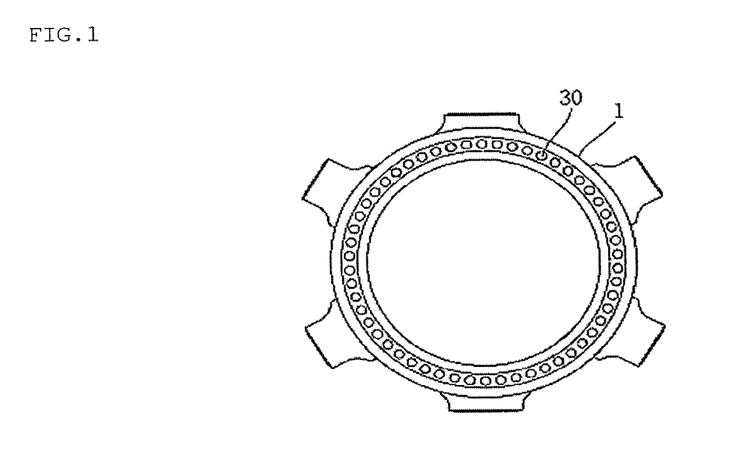
FIG. 1 is a top view illustrating arrangement of stud bolt holes formed on a general nuclear reactor head.

In general, referring to FIG. 1, a plurality of holes 30 for coupling a pressure vessel main body by using stud bolts are formed on a main flange 1 which is a nuclear reactor coolant pump head. The number of holes 30 may be preferably implemented by 48, 54 or 58.

Figure 2:
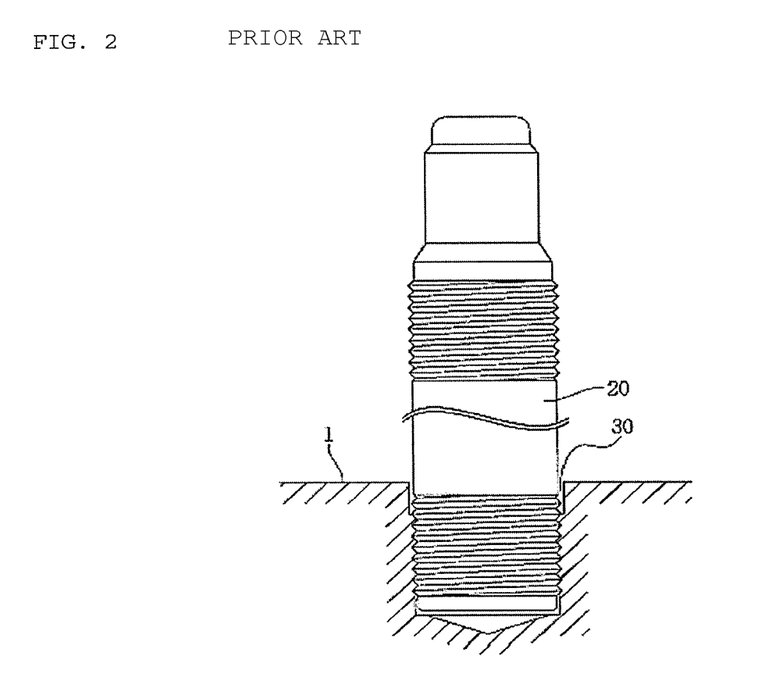
FIG. 2 is a partially cross-sectional view illustrating a coupling state of a stud bolt and a hole.

Although slightly different in size by types of power plants, the nuclear reactor coolant pump head and the nuclear reactor pressure vessel main body are normally coupled by stud bolts and holes as shown in FIG. 2. Such coupling serves to maintain the airtightness and safety in the nuclear reactor which must be kept at a high temperature and a high pressure during operation.

Since the stud bolts and the holes are coupled to each other by a tensioning process, screw threads of the stud bolts and the holes may be easily damaged. Therefore, the cleaning states of the stud bolts and the holes have considerable influence on coupling intensity and damages thereof. The cleaning states of the stud bolts and the holes also prevent adherence of the stud bolts and the holes in disassembly. It is thus very important to maintain the stud bolt holes clean.

Figure 3:
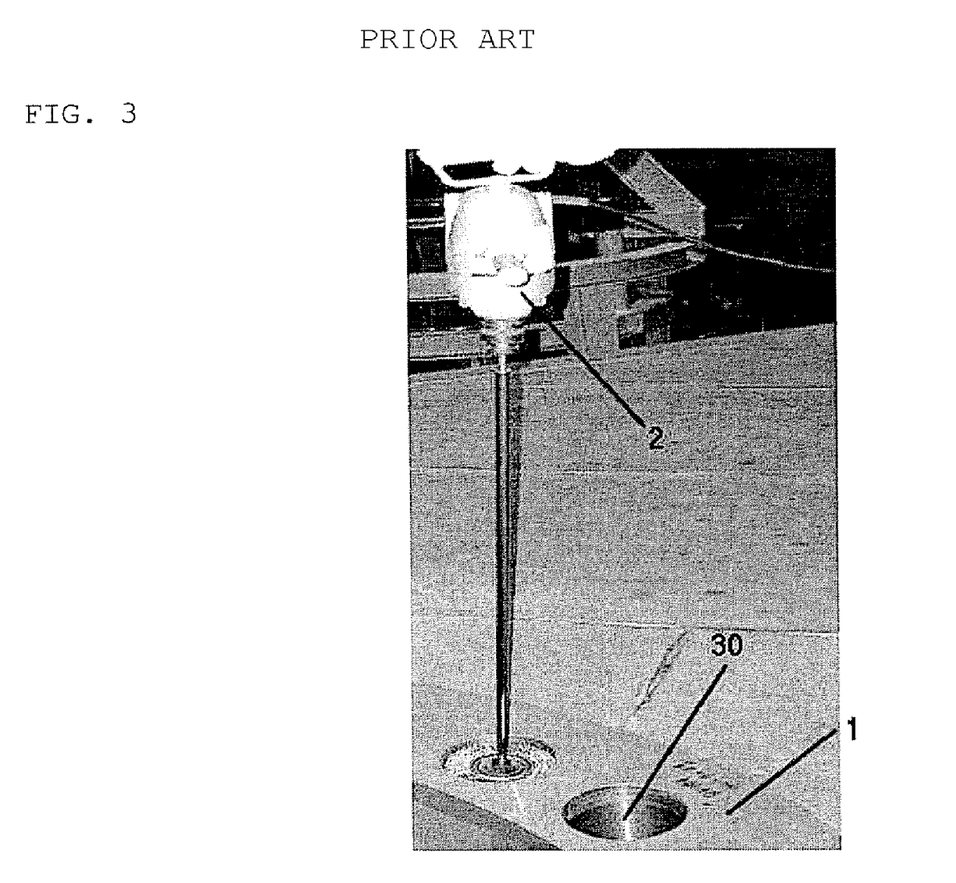
FIG. 3 is a photograph illustrating a state where the holes are cleaned according to the conventional cleaning method.

As illustrated in FIG. 3, the stud bolt holes 30 are cleaned by using an electromotive brush 2. An operator uses the electromotive brush 2 in general wet and dry environments. First, the operator applies cleaning oil to the holes 30, cleans the holes 30 by the brush 2, wraps a cleaning cloth round the brush 2, and wipes the holes 30. The operator accesses the holes 30 and directly performs these operations.

The MHI companies in Japan have suggested a cleaning device for cleaning stud bolt holes in a dry atmosphere by using a brush. However, it is not used due to many operational problems.

The cleaning device cannot clean the stud bolt holes in a wet atmosphere. In addition, the cleaning device does not allow the operator to inspect the holes with the naked eye and manage histories of the holes.

Accordingly, the operator cleans the stud bolt holes in the wet atmosphere by using the electromotive brush or a dust-cloth, and inspects the stud bolt holes with the naked eye by using a mirror.

In the conventional method for cleaning the stud bolt holes, the cleaning operation and the naked eye inspection are individually carried out, and the damage histories of the holes are not managed. Also, it is difficult to generate comparative data for comparing states before and after crack generation and systematically manage the histories of the holes.

The operator who cleans the holes may become a victim of radiation. Furthermore, cleaning efficiency is not improved due to manual operations.

SUMMARY OF THE INVENTION

Therefore, the present invention has been made in view of the above problems, and it is an object of the present invention to provide a system for cleaning and inspecting stud bolt holes, and managing damage histories of the stud bolt holes, which can improve safety of stud bolt holes for maintaining airtightness of a pressure vessel, and systematically manage the stud bolt holes, by developing an automated system which performs dry cleaning, wet cleaning, and naked eye inspection on stud bolt holes of a nuclear reactor and a reactor coolant pump.

It is another object of the present invention to provide a system for cleaning and inspecting stud bolt holes, and managing damage histories of the stud bolt holes, which does not require an additional process in bolt assembly by preparing uncontaminated cleaning surfaces in wet cleaning process by automatically accessing stud bolt holes by using magnetic wheels and cleaning the holes by using a brushing unit, a vacuum cleaner and a cleaning line, and which has excellent performance in a wet atmosphere operation field in which coating of a rust inhibitor and unclamping of stud bolts are performed due to serious adherence of the stud bolts.

Another object of the present invention is to provide a composite system for managing a damage history which can search circular stud bolt holes and collect recorded images through naked eye inspection using a micro camera, and perform composite management such as damage history management and inspection data comparison using an application program.

In accordance with the present invention, the above and other objects can be accomplished by the provision of a system for cleaning and inspecting stud bolt holes, and managing damage histories of the stud bolt holes, including: a main body for cleaning, inspecting and managing the stud bolt holes while moving along a top surface of a cylindrical main flange; a main controller including an automatic control unit and a manual control unit, and a photograph search unit, in which the automatic control unit and the manual control unit, which are connected to the main body, can be automatically and manually controlled, and the photograph search unit manages the states and histories of the holes; a pendent controller for enabling a manual operation, being connected to the main controller; a cleaning water tank for supplying cleaning water to the holes, being connected to the main body; and a vacuum cleaner for sucking alien substances and cleaning water, and keeping them after cleaning the holes.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the drawings, the same or similar elements are denoted by the same reference numbers even though they are depicted in different drawings.

Figure 4:
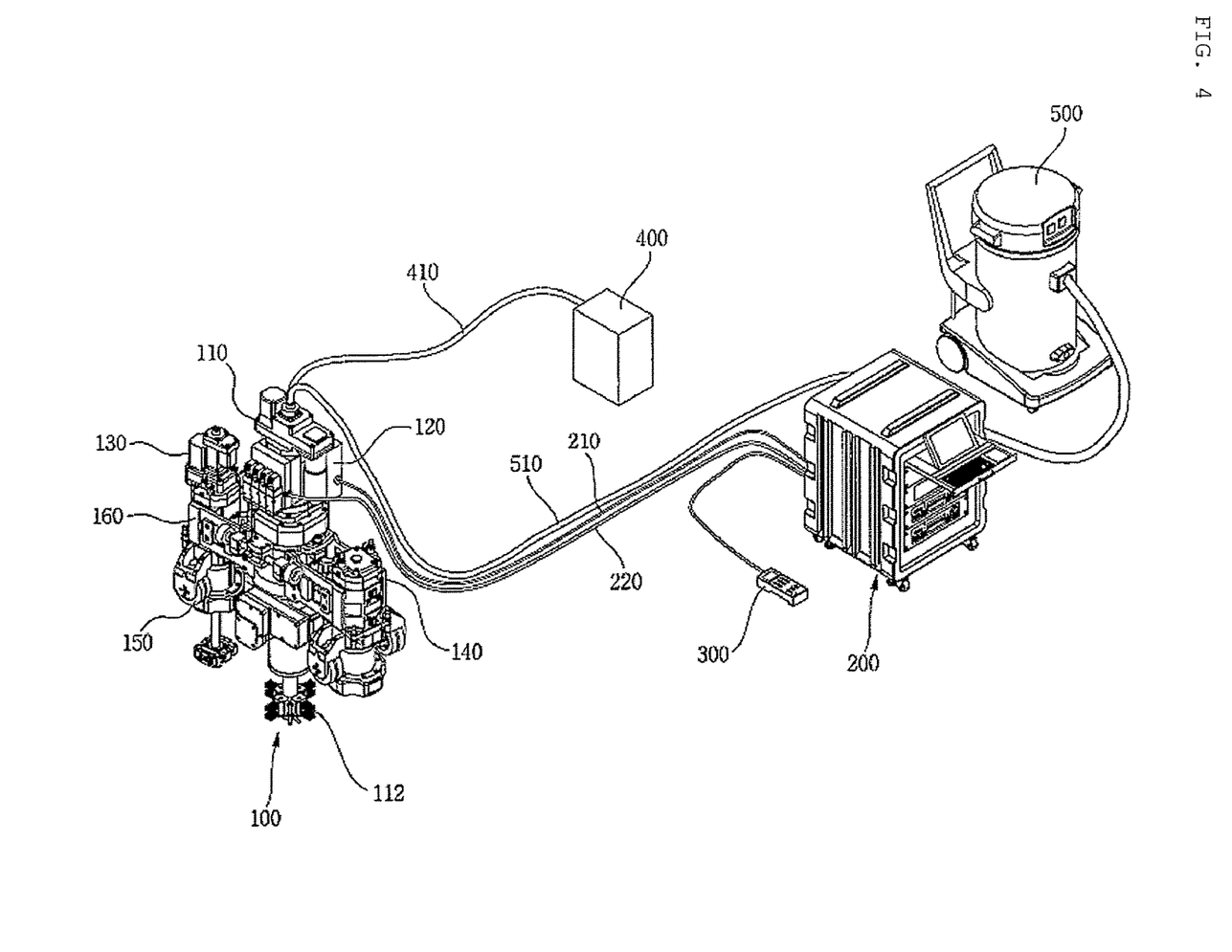
FIG. 4 is a view illustrating a system for cleaning and inspecting stud bolt holes, and managing damage histories of the stud bolt holes, in accordance with the present invention.
Figure 5A:
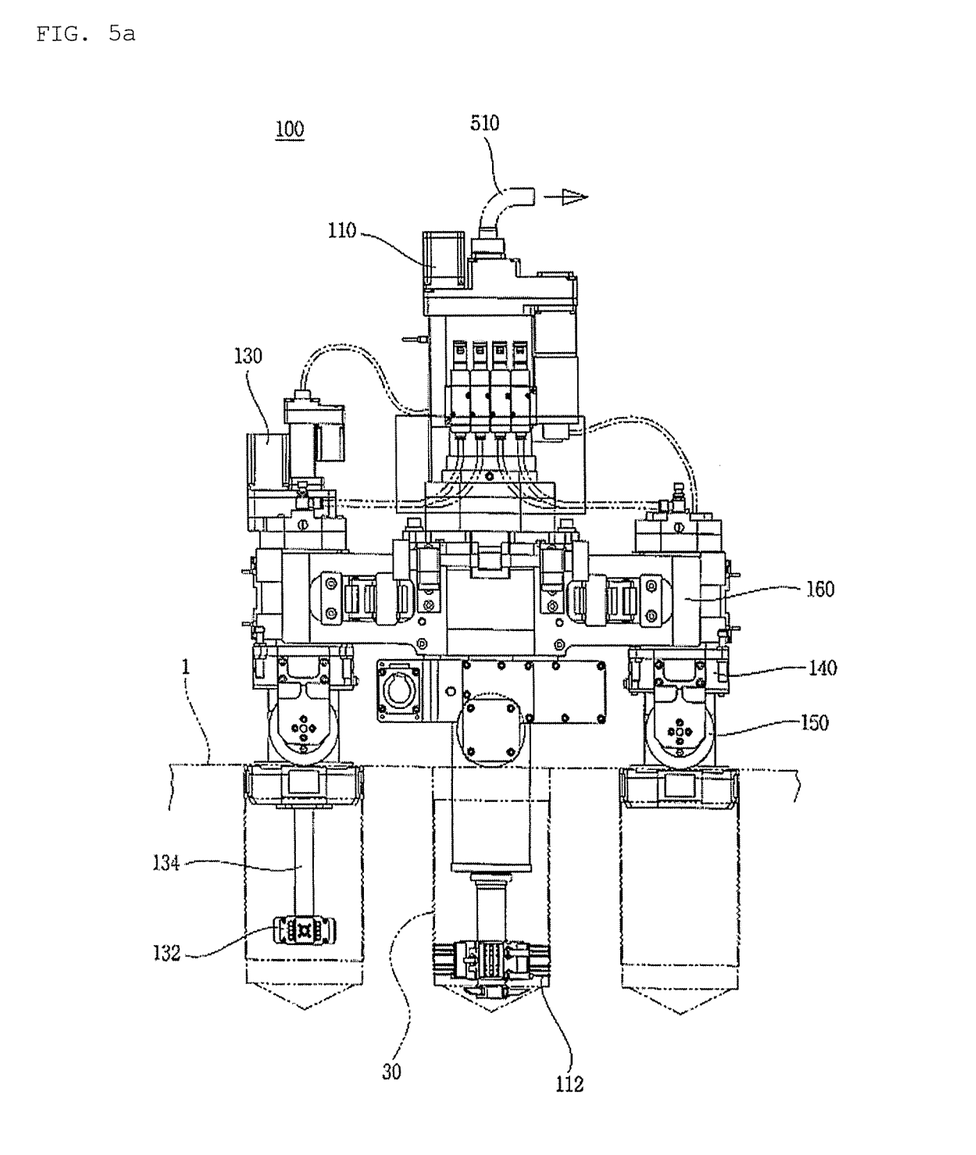
FIG. 5A is a front view illustrating a main body of the system in accordance with the present invention.
Figure 5B:
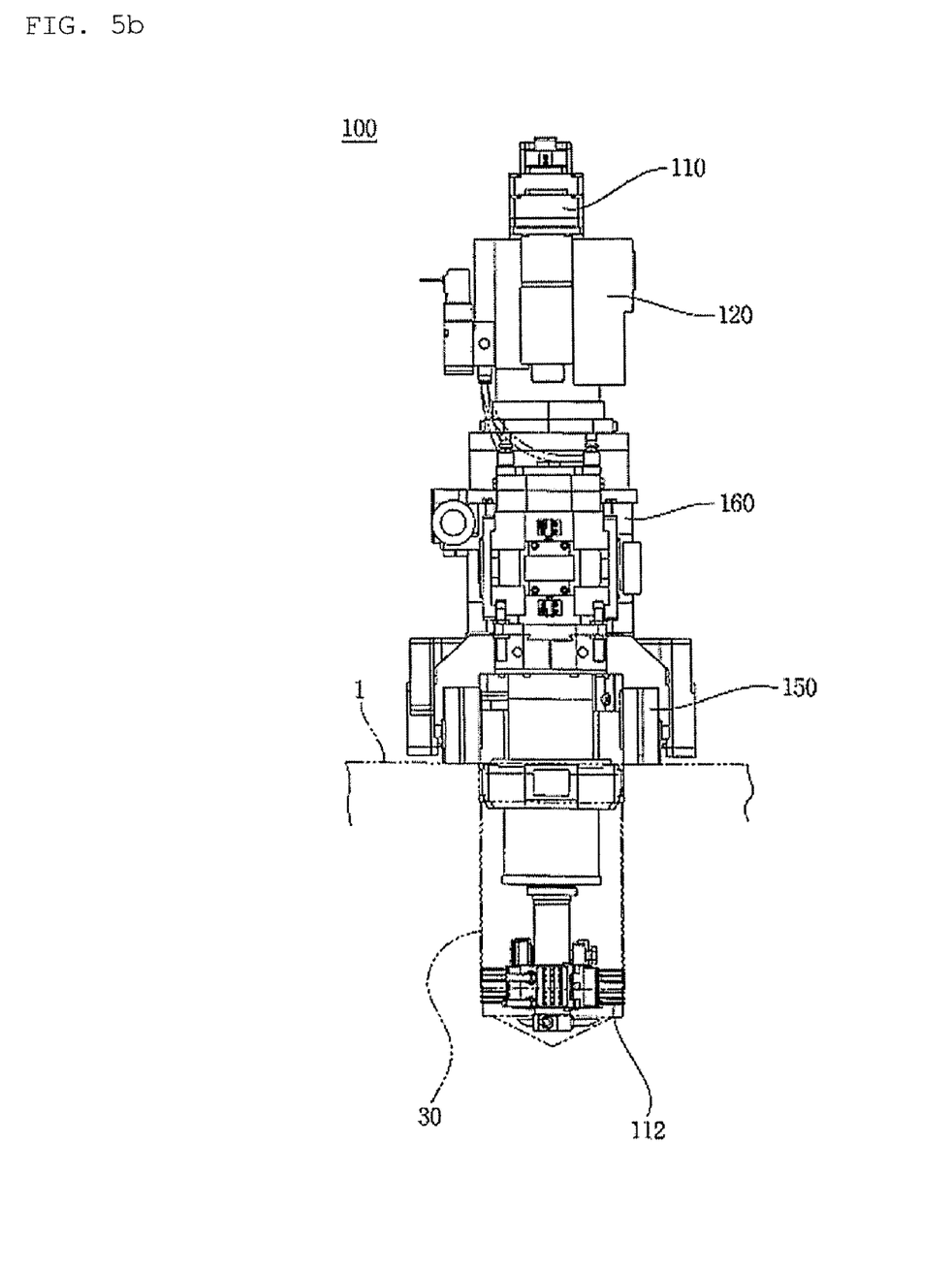
FIG. 5B is a side view illustrating the main body of the system in accordance with the present invention.
Figure 6:
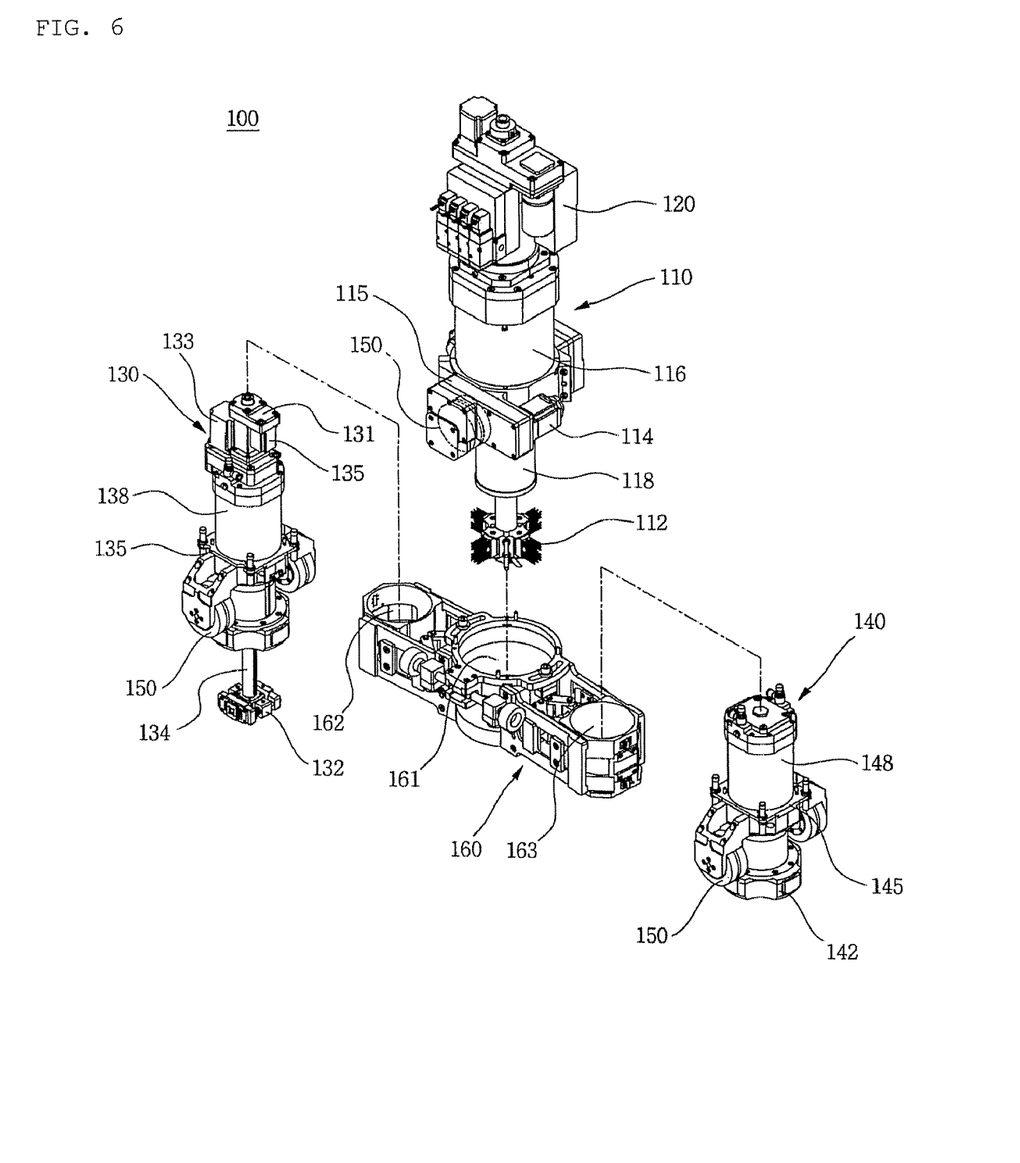
FIG. 6 is a disassembly perspective view illustrating the main body of the system in accordance with the present invention.
Figure 7:
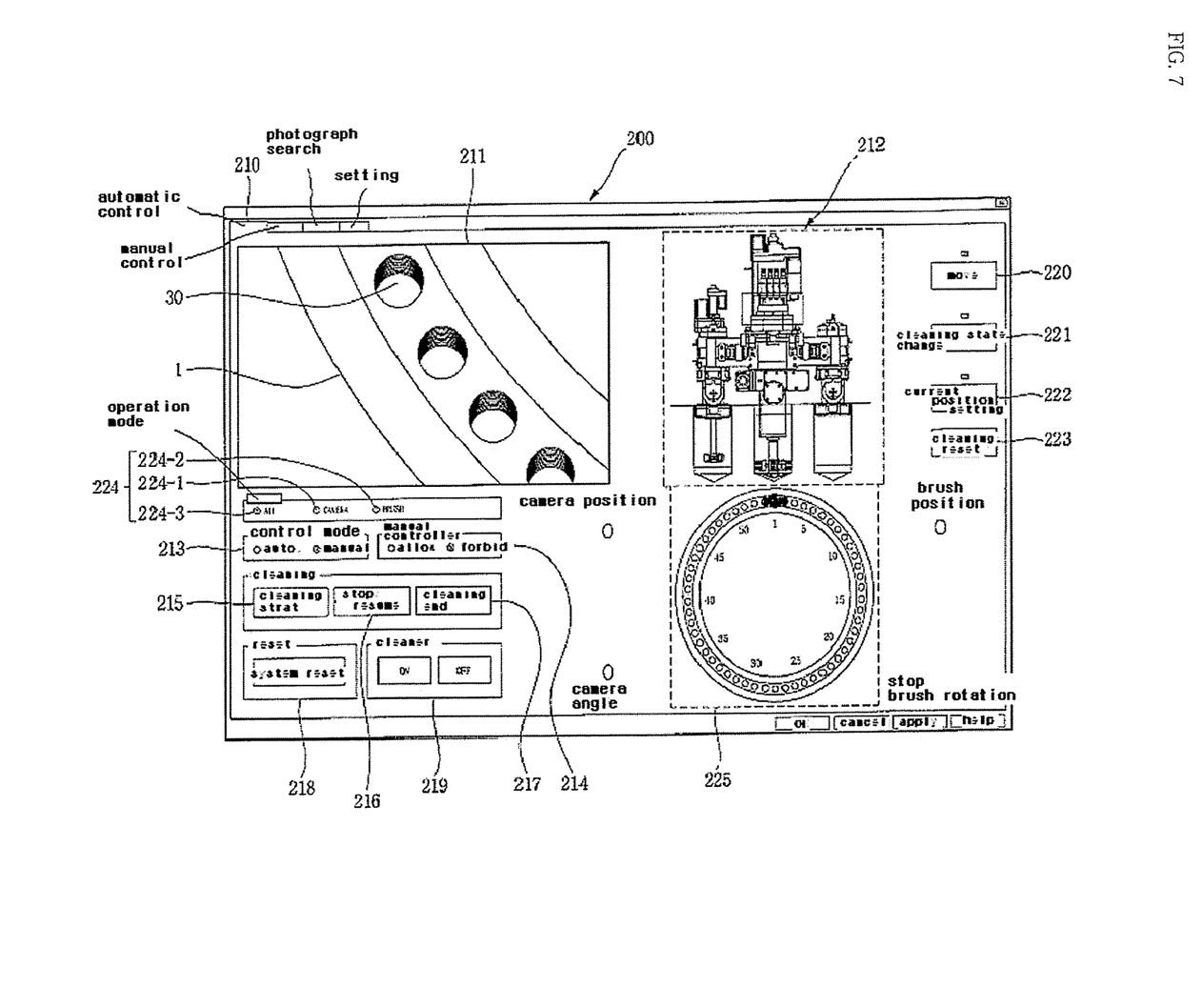
FIG. 7 is a window of an application program, illustrating an automatic control state of a main controller of the system in accordance with the present invention.
Figure 8:
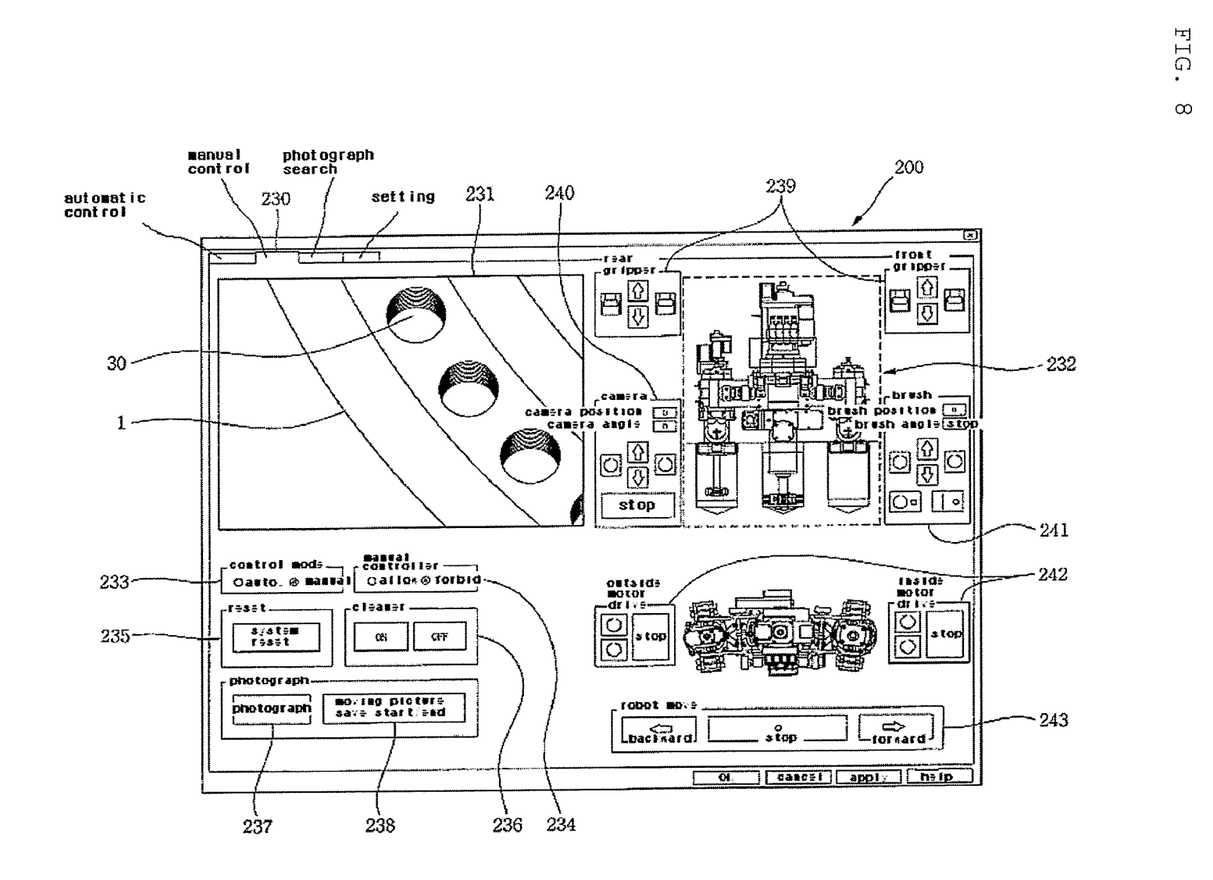
FIG. 8 is a window of the application program, illustrating a manual control state of the main controller of the system in accordance with the present invention.
Figure 9:
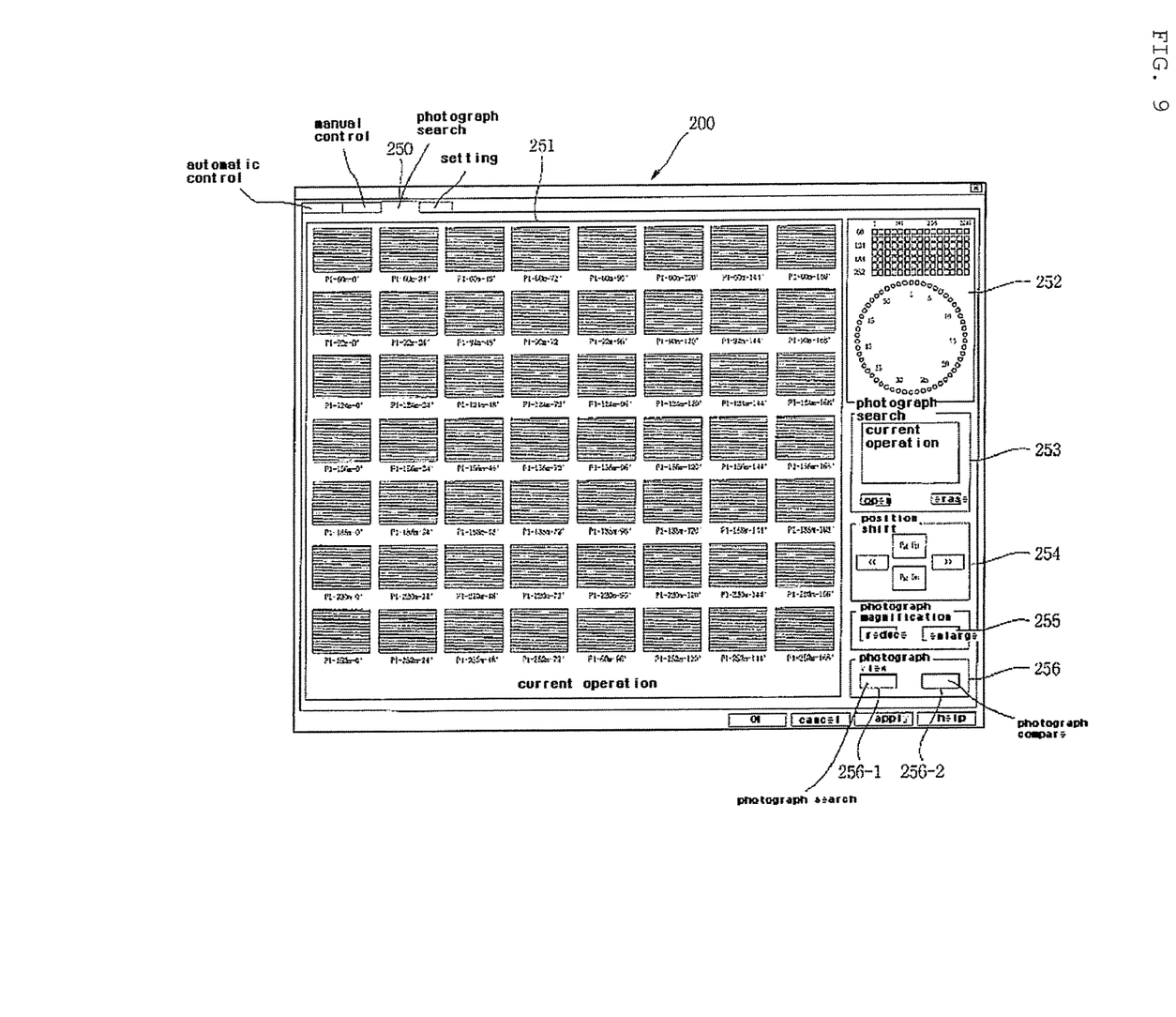
FIG. 9 is a window of the application program, illustrating a damage history management state of the main controller of the system in accordance with the present invention.

FIG. 4 is a view illustrating a system for cleaning and inspecting stud bolt holes, and managing damage histories of the stud bolt holes, in accordance with the present invention. FIG. 5A is a front view illustrating a main body of the system in accordance with the present invention, and FIG. 5B is a side view illustrating the main body of the system in accordance with the present invention. FIG. 6 is a disassembly perspective view illustrating the main body of the system in accordance with the present invention. FIG. 7 is a window of an application program, illustrating an automatic control state of a main controller of the system in accordance with the present invention. FIG. 8 is a window of the application program, illustrating a manual control state of the main controller of the system in accordance with the present invention. FIG. 9 is a window of the application program, illustrating a damage history management state of the main controller of the system in accordance with the present invention.

As illustrated in FIG. 4, the system according to the present invention includes a main body 100, a main controller 200, a pendent controller 300, a cleaning water tank 400 and a vacuum cleaner 500.

The main body 100 moves along a top surface of a cylindrical main flange 1 (refer to FIG. 1) or a rail formed on the top surface of the cylindrical main flange, for cleaning, inspecting and managing stud bolt 20 (refer to FIG. 2) holes 30 (refer to FIG. 2). As shown in FIGS. 4 to 6, the main body 100 includes a brushing unit 110, a built-in control box 120, a naked eye inspecting unit 130, a gripper unit 140, magnetic wheels 150, and a tool clamping unit 160.

The brushing unit 110 for cleaning the stud bolt holes 30 is installed at the center portion of the main body 100.

The structure of the brushing unit 110 will now be briefly described. The brushing unit 110 is configured such that: a suction hose 510 of the vacuum cleaner 500, a cleaning water supply hose 410 of the cleaning water tank 400, and an air supply hose 220 for supplying air are connected to the upper portion of the brushing unit 110; a rough or soft brush 112 is detachably mounted on the lower portion of the brushing unit 110; and a casing 116 including a transfer motor (not shown) for transferring the brush 112 in the up/down direction to clean the holes 30 is installed at the center portion of the brushing unit 110. The brushing unit 110 may also include a first cylinder 118 connecting the casing 116 and the brush 112, in which the first cylinder 118 includes a speed variable motor (not shown) for rotating the brush 112.

In addition, the casing 116 includes a bracket 115 being mounted to move in the up/down direction and having the magnetic wheels 150 at both sides thereof.

Accordingly, the brushing unit 110 automatically or manually cleans the stud bolt holes 30 in a wet or dry atmosphere under the control of the main controller 200.

The built-in control box 120 is installed at one side of the brushing unit 110, so that the main body 100 can be manually controlled by the operation of the pendent controller 300.

Specifically, when an allowable button of a manual controller is clicked in the main controller 200 to manually clean the stud bolt holes 30, the operator can be allowed to operate the pendent controller 300 connected to the built-in control box 120 such that the operator can clean the stud bolt holes 30 by manual operation.

The naked eye inspecting unit 130 is installed at one side of the brushing unit 110, allowing inspection of the inner states of the holes 30.

The naked eye inspecting unit 130 inspects the normality of the holes 30 by using a micro camera and a transfer motor (not shown), and transmits recorded images to the main controller 200.

The structure of the naked eye inspecting unit 130 will now be briefly explained. The naked eye inspecting unit 130 includes an angle unit 131 installed at the upper portion for fixing a camera angle and composition for the stud bolt holes 30, a camera housing 132 being installed at the bottommost portion and including a camera (not shown) for photographing images inside the holes 30, a hollow camera shaft 134 for connecting the angle unit 131 to the camera housing 132, a transfer motor 133 for transferring the camera shaft 134 in the up/down direction, a rotating motor 135 for rotating the camera shaft 134, a second cylinder 138 for surrounding the external appearance of the camera shaft 134, and a first holder 135 being movably mounted on the outer portion of the second cylinder 138 and having the magnetic wheels 150 at both sides.

Also, the naked eye inspecting unit 130 includes grippers (not shown) for fixing the camera shaft 132 when the camera shaft 132 is arranged in a target position.

The gripper unit 140 fixes the main body 100 to the stud bolt holes 30. Here, the gripper unit 140 fixes the main body 100 so that the brushing unit 110 and the naked eye inspecting unit 130 can correspond to the holes 30.

The structure of the gripper unit 140 will now be briefly explained. The gripper unit 140 includes a gripper 142 mounted on the lower portion and inserted into the stud bolt hole 30 for fixing the main body 100, a third cylinder 148 having a plurality of springs (not shown) for elastically moving the gripper 142 in the up/down direction, and a second holder 145 being movably mounted on the outer portion of the third cylinder 148 and having the magnetic wheels 150 at both sides.

As described above, the magnetic wheels 150 are installed at the brushing unit 110, the naked eye inspecting unit 130 and the gripper unit 140, respectively, so that the main body 100 can move along the circular arc of the nuclear reactor main flange 1 without being separated from the top surface of the main flange 1.

The magnetic wheels 150 are preferably made of permanent magnet and urethane.

The tool clamping unit 160 is coupled to the brushing unit 110 through a first coupling hole 161, the naked eye inspecting unit 130 through a second coupling hole 162, and the gripper unit 140 through a third coupling hole 163, thereby incorporating the aforementioned elements.

At this point, the second coupling hole 162 and the third coupling hole 163 can exchange their roles.

A cushion body (not shown) is installed at the tool clamping unit 160, for moving the tool clamping unit 160 in the up/down direction. Accordingly, when the main body 100 moves along the top surface of the cylindrical main flange 1, the movement angle of the main body 100 can be controlled according to the state of the top surface such as concave, convex or foreign elements.

As depicted in FIGS. 7 to 9, the main controller 200 is connected to the built-in control box 120 of the main body 100 by a control cable 210, and includes an automatic control unit 210 and a manual control unit 230 for enabling automatic and manual operations, and a photograph search unit 250 for managing the states and histories of the holes 30.

Referring to FIG. 7, the automatic control unit 210 of the main controller 200 includes a video screen display unit 211, a proceeding state display unit 212, a control mode select unit 213, a manual control unit 214, a cleaning start button unit 215, a temporary stop and resume button unit 216, a cleaning end button unit 217, a system reset button unit 218, a cleaner on/off button unit 219, a moving unit 220, a cleaning state change unit 221, a current position set unit 222, a cleaning reset button unit 223, and a cleaning mode select button unit 224.

The video screen display unit 211 displays image signals from the micro camera in a real time.

The proceeding state display unit 212 displays a driving state, and a position and a sensor input state of the main body 100, so that the operator can check the whole state of the main body 100 through a monitor.

The control mode select unit 213 includes automatic and manual control modes for automatic and manual cleaning.

When 'automatic' is selected in the control mode select unit 213, it means an automatic cleaning mode. Only when the automatic control mode is selected, the automatic cleaning is performed. At this point, command buttons relating to the manual operation cannot be operated.

Conversely, when 'manual' is selected in the control mode select unit 213, it means a manual operation mode. The command buttons of the manual operation screen can be operated, but the command buttons relating to the automatic cleaning such as 'cleaning start' cannot be operated.

The manual control unit 214 decides use of the pendent controller 300 for performing minute control in an adjacent position to the working field.

In the case that use of the manual pendent controller 300 is allowed in the manual control unit 214, the operator can operate the pendent controller 300 connected to the built-in control box 120 of the main body 100 in a special adjacent position.

Specifically, when 'allow' is selected in the manual control unit 214, the operation of the pendent controller 300 is allowed. Therefore, the operator can operate the pendent controller 300 connected to the built-in control box 120 of the main body 100. When 'forbid' is selected, the operation of the pendent controller 300 is not allowed.

When the automatic control mode is selected to allow the automatic cleaning of the main body 100, the cleaning start button unit 215 can be operated.

The temporary stop and resume button unit 216 temporarily stops or resumes the automatic cleaning.

Accordingly, the temporary stop and resume button unit 216 can be used only in the automatic cleaning state. On the other hand, 'system reset' is necessary to resolve the problems occurring in the cleaning operation. The temporary stop and resume button unit 216 serves to temporarily stop the system for reset.

The cleaning end button unit 217 forcibly ends the cleaning operation of the stud bolt holes 30. At this point, the system cleans the current hole 30 and stops the operation.

The system reset button unit 218 returns the brushing unit 110, the naked eye inspecting unit 130 and the gripper unit 140 to original positions by resetting set values of the main body 100.

The cleaner on/off button unit 219 manually turns on or off the vacuum cleaner 500.

The operator can move the main body 100 to the corresponding hole 30 for cleaning or naked eye inspection, by using the moving unit 220.

The cleaning state change unit 221 changes the cleaning state of the corresponding hole 225. That is, the cleaning state of the hole 225 designated by the operator is changed into the non-cleaning state.

At this point, the cleaning-completed hole 225 is marked by a blue color. When the operator selects the cleaning-completed hole 225 and clicks the cleaning state change button 221, the state of the hole 225 is changed into the non-cleaning state.

The current position set unit 222 designates the current hole position 225 of the main body 100. The number of the hole 225 in which the main body 100 is positioned can be set as the number of the hole 225 designated by the operator.

Even if the hole 225 has been cleaned, the cleaning reset button unit 223 resets the cleaning state of the hole 225 into the non-cleaning state.

Before the automatic/manual operation, the operator can reset the system by clicking the system reset button, and during the automatic operation, the operator can stop the automatic operation by clicking the temporary stop button and reset the system by clicking the system reset button.

The cleaning mode select button unit 224 controls mode conversion in the case that the specific hole is individually inspected or cleaned after the inspection completion or during the inspection.

Specifically, the cleaning mode select button unit 224 includes a camera mode button 224-1 which does not perform the cleaning operation using the brush 112 but captures the cleaning state under the cleaning start command, a brush mode button 224-2 which does not capture the cleaning state by the camera but performs the cleaning operation using the brush 112 under the cleaning start command, and an all mode button 224-3 which performs the cleaning operation using the brush 112 and captures the cleaning state by the camera at the same time.

As shown in FIG. 8, the manual control unit 230 of the main controller 200 includes a video screen display unit 231, a proceeding state display unit 232, a control mode select unit 233, a manual control unit 234, a system reset button unit 235, a cleaner on/off button unit 236, a photographing button unit 237, a moving image storing unit 238, a gripper operating unit 239, a camera operating unit 240, a brush operating unit 241, a motor driving unit 242, and a moving unit 243.

The video screen display unit 231 displays image signals from the micro camera in a real time. The operator can inspect and check damages of threads, and store the part photographed by the camera as an image file.

The proceeding state display unit 232 displays a driving state, and a position and a sensor input state of the main body 100, so that the operator can see the whole state of the main body 100. Accordingly, errors by the manual control can be prevented in advance.

The control mode select unit 233 includes automatic and manual control modes for automatic and manual cleaning.

When 'automatic' is selected in the control mode select unit 233, it means an automatic cleaning mode. Only when the automatic control mode is selected, the automatic cleaning is performed. At this point, command buttons relating to the manual operation cannot be operated.

On the other hand, when 'manual' is selected in the control mode select unit 233, it means a manual operation mode. The command buttons of the manual operation screen can be operated, but the command buttons relating to the automatic cleaning such as 'cleaning start' cannot be operated.

The manual control unit 234 decides allowance of the manual cleaning.

The system reset button unit 235 returns the brushing unit 110, the naked eye inspecting unit 130 and the gripper unit 140 to original positions by resetting the set values of the main body 100.

The cleaner on/off button unit 236 manually turns on/off the cleaner 500.

The photographing button unit 237 takes still images of the video screens for the states of the holes 30, and stores the still images in a folder.

The video screens photographed by the photographing button unit 237 are not searched by a photograph search, but seen by a general graphic file viewer. Here, the file names are automatically created on the basis of the current hole, depth, angle and view, etc.

The moving image storing unit 238 manually operates a function of photographing the contents of the micro camera screen as moving images and storing the moving images.

The gripper operating unit 239 controls the up/down movement of the front and rear grippers, and locks and unlocks the grippers.

In a state where the camera is not lowered (98 mm), if the rear gripper is lowered, it damages the system. Therefore, the operator must always be very cautious and careful when operating the rear gripper.

The camera operating unit 240 controls the up/down movement and rotation of the camera, and displays the position and angle of the camera on the screen.

The brush operating unit 241 controls the up/down movement and rotation of the brush 112, and displays the position and rotation state of the brush 112 on the screen.

The motor driving unit 242 controls driving of the motors mounted outside and inside the main body 100. For example, the motor driving unit 242 controls the respective motors such that they can perform forward/backward rotation, and stop, respectively.

The moving unit 243 moves the main body 100 to the corresponding hole 30. Specifically, the moving unit 243 enables the operator to manually operate the forward/backward movement and stop of the main body 100.

As illustrated in FIG. 9, the photograph search unit 250 of the main controller 200 includes a photograph display unit 251, a reference map screen unit 252, a photograph searching unit 253, a position shift unit 254, a photograph magnification adjusting unit 255, and a photograph observing unit 256.

The photograph display unit 251 displays the photographs of the stud bolt holes 30 photographed by the camera. The size and arrangement of the photographs of the stud bolt holes 30 are adjusted according to the magnification thereof.

The reference map screen unit 252 enables the operator to change the hole numbers and positions of the displayed photographs by mouse-clicking.

The photograph searching unit 253 enables the operator to infinitely open or erase the previous operation photograph files of the corresponding hole 30.

The position shift unit 254 shifts the photograph arrangement on the screen in the up/down and right/left directions.

The photograph magnification adjusting unit 255 adjusts a display magnification of the photograph arrangement so that the operator can make a precise decision.

The photograph observing unit 256 enables the operator to manage the history of the corresponding hole 30, by searching for and opening the previous operation photograph of the hole 30 and comparing the current state with the previous state on the screen.

At this point, when the operator intends to search for the current operation photograph and the previous operation photograph, he/she uses a photograph search mode by clicking a photograph search button 256-1.

In addition, the operator can select a mode of comparing the current operation photograph with the previous operation photograph by clicking a photograph comparison button 256-2.

The pendent controller 300 passing through the main controller 200 is connected to the built-in control box 120 of the main body 100 through the control cable 210.

When the operator selects a mode of manually operating the main body 100 in the main controller 200, he/she manually operates the main body 100 through the corresponding screen display unit of the main controller 200 by using the corresponding switch of the pendent controller 300.

Instead of cleaning and inspecting all stud bolt holes 30 formed on the nuclear reactor main flange 1, the operator can select, clean and inspect the holes 30.

Specifically, the operator can selectively clean the holes 30 by comparing the previous photograph screens of the holes 30 with the current video screens of the holes 30.

The cleaning water tank 400 is used in wet cleaning. A cleaning solution is supplied to the holes 30 through the cleaning water supply hose 410 connected to the holes 30 through the upper portion of the main body 100.

The cleaning solution supply of the cleaning water tank 400 is controlled by the built-in control box 120, but can also be controlled by clicking the corresponding switch of the main controller 200.

When the operator intends to dry-clean the holes 30, the air generated by a ventilator (not shown) installed at the main controller 200 or the peripheral region thereof is supplied to the holes 30 through the air supply hose 220 connected to the upper portion of the main body 100. It can be also used in the manual cleaning of the holes 30 by the pendent controller 300.

The vacuum cleaner 500 is connected to the holes 30 by the suction hose 510 through the upper portion of the main body 100. The vacuum cleaner 500 sucks alien substances and cleaning water and keeps them during/after the automatic or manual cleaning of the holes 30.

The vacuum cleaner 500 is automatically or manually controlled by the main controller 200 or the pendent controller 300.

The operator can select and perform the general wet and dry cleaning modes of the holes 30 according to the current states of the holes 30. These cleaning modes can be collectively carried out in one process.

The operational state of the system for cleaning and inspecting the stud bolt holes and managing the damage histories thereof in accordance with the present invention will now be briefly explained.

The operator unclamps the stud bolts which couple the nuclear reactor coolant pump and the pressure vessel main body, and transfers the main body 100 of the system for cleaning and inspecting the holes 30 to the upper portion of the nuclear reactor main flange 1.

Afterwards, the operator selects the automatic or manual cleaning of the stud bolt holes 30 of the nuclear reactor main flange 1 through the main controller 200.

When the operator clicks the automatic control button 210 for automatically cleaning the holes 30, a corresponding hole, a cleaning time, and a cleaning solution or air supply quantity set to clean one hole are provided to the holes 30. The brush 112 mounted on the brushing unit 110 starts to clean the holes 30, respectively.

After a predetermined cleaning time elapses, the naked eye inspecting unit 130 is installed at the cleaned hole 30 while the main body 100 automatically moves to the next one of the holes 30. The naked eye inspecting unit 130 installed at the hole 30 inspects and takes a photograph of the inside of the hole 30 at the same time. The state of the holes 30 is displayed on the display unit of the main controller 200 and stored therein. At this point, the brushing unit 110 moved to the next hole 30 continuously performs the cleaning operation.

During the cleaning and inspection of the hole 30, if the operator finds an incompletely-cleaned hole 30 through the video screen unit 211, the operator clicks the temporary stop button and transfers the main body 100 to the hole 30 again to clean the hole 30. Here, the cleaning mode can be converted into the manual control mode 230.

After cleaning the holes 30 completely, the main body 100 returns to the original position.

On the other hand, when the operator selects the manual control mode 230 of the main controller 200, he/she manually cleans the holes 30 by clicking the corresponding buttons of the main controller 200 or the corresponding switches of the pendant controller 300. At this point, the operator can control a cleaning time and a cleaning solution or air quantity according to the state of the holes 30 displayed on the screen of the main controller 200.

After cleaning one hole 30, the operator transfers the brushing unit 110 of the main body 100 to the next hole 30 to continuously perform the cleaning operation by clicking the corresponding switch of the pendant controller 300, and inspects the cleaned hole 30 with the naked eye and takes a photograph of the hole 30 by clicking the corresponding switch.

After finishing the manual cleaning of entire holes 30 by the above procedure, the operator returns the main body 100 to the original position by clicking the corresponding switch of the pendent controller 300.

The states of the holes 30 photographed in the cleaning operation are stored in a database. The operator can manage the histories of the holes 30 by sensing the state changes of the holes 30 in every cleaning. As a result, the operator can predict and prevent water leakage of the nuclear reactor coolant pump in advance by easily checking damages of the holes 30.

As apparent from the above description, the present invention provides the system for cleaning and inspecting the stud bolt holes, and managing the damage of the stud bolt holes, which can perform dry cleaning, wet cleaning and naked eye inspection on the stud bolt holes of the nuclear reactor and the nuclear reactor coolant pump at a time, improve the safety of the stud bolt holes for maintaining the airtightness of the pressure vessel, systematically manage the histories of the stud bolt holes, shorten the cleaning time, improve the cleaning quality, restrict radiation exposure of the operator, reduce the fatigue of the operator, and improve convenience in operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for cleaning and inspecting stud bolt holes, and managing damage histories of the stud bolt holes, comprising:
    a main body for cleaning, inspecting and managing the stud bolt holes while moving along a top surface of a cylindrical main flange;
    a main controller including an automatic control unit and a manual control unit, and a photograph search unit, in which the automatic control unit and the manual control unit, which are connected to the main body, can be automatically and manually controlled, and the photograph search unit manages the states and damage histories of the stud bolt holes;
    a pendent controller for enabling a manual operation, being connected to the main controller;
    a cleaning water tank for supplying cleaning water to the stud bolt holes, being connected to the main body; and
    a vacuum cleaner for sucking alien substances and cleaning water, and keeping them after cleaning the stud bolt holes.

2. The system according to claim 1, wherein the main body moves along a rail formed on the top surface of the cylindrical main flange.

3. The system according to claim 1, wherein the main body comprises:
    a brushing unit being installed at the center of the main body, and including a brush detachably mounted on its bottommost end, and a first speed of a variable motor for rotating the brush;
    a built-in control box installed at one side of the brushing unit, so that the main body can be manually controlled by the operation of the pendent controller;
    a naked eye inspecting unit installed at one side of the brushing unit, for inspecting the inside states of the stud bolt holes;
    a gripper unit for fixing the main body so that the brushing unit and the naked eye inspecting unit can correspond to the stud bolt holes;
    magnetic wheels for moving the main body along a circular arc of the cylindrical main flange without being separated from the top surface of the cylindrical main flange; and
    a tool clamping unit for combining the brushing unit, the naked eye inspecting unit and the gripper unit.

4. The system according to claim 3, wherein the naked eye inspecting unit inspects the normality of the stud bolt holes by using a micro camera and a second transfer motor, and transmits recorded images to the main controller.

5. The system according to claim 3, wherein the magnetic wheels are made of permanent magnet and urethane.

6. The system according to claim 3, wherein the tool clamping unit is movable in the up/down direction, for controlling a movement angle of the main body according to the state of the top surface of the cylindrical main flange, when the main body moves along the top surface of the cylindrical main flange.

7. The system according to claim 1, wherein the automatic control unit of the main controller comprises:
- a video screen display unit for displaying image signals from a micro camera in a real time;
- a proceeding state display unit for displaying a driving state, a position and a sensor input state of the system;
- a control mode select unit including automatic and manual control modes for automatic and manual cleaning;
- a manual control unit for deciding allowance of the manual cleaning;
- a cleaning start button unit operated only when the automatic control mode is selected to allow the automatic cleaning;
- a temporary stop and resume button unit for temporarily stopping or resuming the automatic cleaning;
- a cleaning end button unit for forcibly ending the cleaning operation of the stud bolt holes;
- a system reset button unit for returning the brushing unit, the naked eye inspecting unit and the gripper unit to original positions;
- a cleaner on/off button unit for manually turning on or off a cleaner;
- a moving unit for moving the main body to a corresponding stud bolt hole;
- a cleaning state change unit for changing a cleaning state of the corresponding stud bolt hole;
- a current position set unit for designating a current stud bolt hole position of the main body;
- a cleaning reset button unit for resetting the cleaning state of the stud bolt hole into a non-cleaning state, even if the stud bolt hole has been cleaned; and
- a cleaning mode select button unit for controlling the cleaning mode of the stud bolt holes.

8. The system according to claim 7, wherein, in the control mode select unit, the manual cleaning command buttons are not controllable in the automatic cleaning, and automatic cleaning command buttons are not controllable in the manual cleaning.

9. The system according to claim 7, wherein, when the manual control unit allows the manual cleaning, the pendent controller connected to the built-in control box of the main body can be operated.

10. The system according to claim 7, wherein the cleaning mode select button unit comprises:
- a camera mode button which does not perform a cleaning operation using the brush but captures the cleaning state under a cleaning start command;
- a brush mode button which does not capture the cleaning state by the micro camera but performs the cleaning operation using the brush under the cleaning start command; and
- an all mode button which performs the cleaning operation using the brush and captures the cleaning state by the micro camera at the same time.

11. The system according to claim 1, wherein the manual control unit of the main controller comprises:
- a video screen display unit for displaying image signals from the micro camera in a real time, and storing the image signals in an image file;
- a proceeding state display unit for displaying a driving state, a position and a sensor input state of the system;
- a control mode select unit including automatic and manual control modes for automatic and manual cleaning;
- a manual control unit for deciding allowance of the manual cleaning;
- a system reset button unit for returning the brushing unit, the naked eye inspecting unit and the gripper unit to original positions;
- a cleaner on/off button unit for manually turning on/off the cleaner;
- a photographing button unit for taking still images of the video screens for the states of the stud bolt holes, and storing the still images in a folder;
- a moving image storing unit for manually operating a function of photographing the contents of a micro camera screen as moving images and storing the moving images;
- a gripper operating unit for controlling the movement of the front and rear grippers, and locking and unlocking the grippers;
- a camera operating unit for controlling an up/down movement and rotation of the camera, and displaying the position and angle of the camera on the screen;
- a brush operating unit for controlling the up/down movement and rotation of the brush, and displaying the position and rotation state of the brush on the screen;
- a motor driving unit for controlling the motors mounted on the main body; and
- a moving unit for moving the main body to the corresponding stud bolt hole.

12. The system according to claim 1, wherein the photograph search unit of the main controller comprises:
- a photograph display unit for adjusting the size and arrangement of the photographs of the stud bolt holes according to the magnification thereof;
- a reference map screen unit for changing the stud bolt hole numbers and positions of the displayed photographs;
- a photograph searching unit for opening or erasing the previous operation photograph files of the corresponding stud bolt hole;
- a position shift unit for moving the photograph arrangement on the screen in the up/down and right/left directions;
- a photograph magnification adjusting unit for adjusting a display magnification of the photograph arrangement so that an operator can make a precise decision; and
- a photograph observing unit for enabling the operator to manage the damage history of the corresponding stud bolt hole, by searching for and opening a previous operation photograph of the corresponding stud bolt hole and comparing the current state with the previous state.

* * * * *